March 31, 1942.   T. L. FAWICK   2,278,068
ASSEMBLY FOR CLUTCHES, BRAKES, AND THE LIKE
Original Filed Sept. 19, 1936
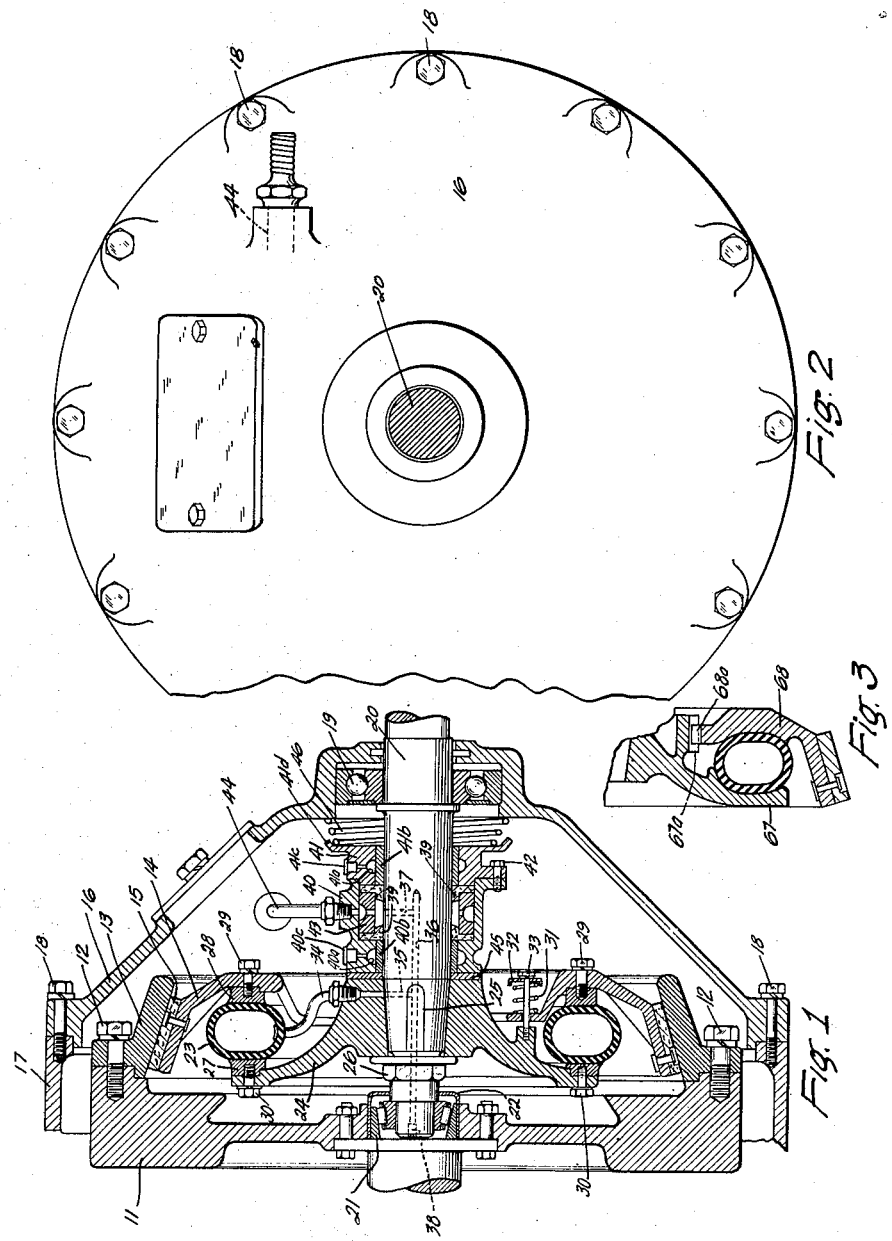
INVENTOR
Thomas L. Fawick
BY
Willard D. Eakin
ATTORNEY Patented Mar. 31, 1942

2,278,068

UNITED STATES PATENT OFFICE 2,278,068

ASSEMBLY FOR CLUTCHES, BRAKES, AND THE LIKE

Thomas L. Fawick, Akron, Ohio, assignor to The Fawick General Company, Inc., Akron, Ohio, a corporation of Indiana Original application September 19, 1936, Serial No. 101,638. Divided and this application January 14, 1941, Serial No. 374,365

6 Claims. (Cl. 192—88)

This invention relates to assemblies adapted to be used in clutch or brake mechanisms and for similar purposes.

Its chief objects are to provide:

Simplicity and economy of construction; improved lubrication; durability; compensation for shaft mis-alignment; facility of replacement of parts; adaptability for fluid-pressure actuation; and desirable cushioning action.

This application is a division of my application Serial No. 101,638, filed September 19, 1936, Patent No. 2,251,443, August 5, 1941, and some of the subject matter disclosed herein is described and claimed in my United States Patents No. 2,111,422, granted March 15, 1938; No. 2,141,645, granted December 27, 1938; and No. 2,213,000, granted August 27, 1940; and my copending application Serial No. 365,489, filed November 13, 1940, Patent No. 2,251,445, August 5, 1941.

Of the accompanying drawing:

Fig. 1 is a vertical, longitudinal section of a clutch mechanism embodying my invention in one of its preferred forms.

Fig. 2 is an elevation of the same taken from the right of Fig. 1, the driven shaft being shown in section.

Fig. 3 is a fragmentary section of a modification.

Referring to the drawing, and at first to the mechanism of Figs. 1 and 2, the embodiment there shown comprises the crank-shaft 10 and fly-wheel 11 of a motor, the fly-wheel having secured to it by cap-screws 12, 12 a female cone-clutch member 13 adapted to mate with a male cone-clutch member 14 provided with a clutch-facing 15. A clutch housing 16 is secured to the crank case 17 of the motor by cap screws 18, 18 and in its smaller end is mounted an oil-seal ball-bearing 19 for the driven shaft 20, which is provided also with a radial-and-thrust bearing 21 interposed between it, the fly-wheel and the crank-shaft. A grease-retaining cup surrounds the end portion of the shaft 20 and is held in place by its side wall being embraced between the outer race of the bearing and the inner face of the fly-wheel hub.

For driving the male clutch member 14 and also for forcing it into engagement with the female clutch member a distensible annular bag 23 of rubber or rubber-like material is interposed between and connected to the male clutch member and to a wheel member 24, here shown as being of the disk type, which is secured upon the shaft 20 by a spline 25 and a nut 26.

Preferably the bag 23 has secured to opposite, axially spaced side faces, as by vulcanization, respective metal rings 27, 28 tapped in their outer faces for the reception of cap-screws 29, 29, 30, 30 securing the rings respectively to the members 14 and 24, this construction providing facility of replacement of parts and permitting manufacture and shipment of the bag assembly without the handling of heavy metal parts.

The bag can be provided with any desired type of cord-reinforcement, the bias-cord fabric reinforcement such as is commonly used in pneumatic tires being permissible for transmission of heavy torque, the shafts being held accurately in alignment by the bearings 19 and 21, and the bag can be mold-vulcanized either to circular cross-sectional form and held in a flattened form by the clutching pressure when the clutch members are engaged, as shown, or it can be mold vulcanized to a more flattened form, if desired. For effecting clutch dis-engagement, however, it is preferable to employ circumferentially-spaced compression springs such as the spring 31 which are interposed between the male clutch member 14 and respective spring-seat washers 32 mounted on spring-guide bolts such as the bolt 33 extending freely through holes in the clutch member and screwed into the wheel member 24, for urging the member 14 toward its de-clutched position. Because of their extending freely through the holes, as stated, the bolts 33 are not torque-transmitting, the entire torque being transmitted by the above described bag 23.

For distending and for venting the bag 23 it has connection through a preferably flexible armored hose 34 with communicating transverse and longitudinal holes 35, 36, 37 drilled in the shaft 20, the longitudinal hole 36 being closed by a screw plug 38 or the like at its outer end and the transverse hole 37 being in communication, at the surface of the shaft, with the annular channel of a fluid-supplying distributor-ring assembly.

This assembly comprises two lip-seal washers 39, 39, of leather or the like, of L-shape in cross-section and each preferably formed in two half-circle sections for easy removal and replacement.

For holding the sealing washers 39 in place their radial flanges are gripped between a spacer-ring 43 and interfitting oil-distributor rings 40, 41, which can be endless and adapted to be held together in interfitted relation by axially-disposed cap-screws such as that shown at 42, although it is not essential that they be endless or brought into interfitted relation by axial movement.

For supplying pressure fluid to the passage 37 through the annular space between the sealing rings the spacer ring 43 is formed with at least one radial through-aperture having a large outer end to assure fluid-conducting registry with a radial through-aperture formed in the oil-distributor ring 40 and having connected to it a preferably flexible and armored hose 44 leading, through an aperture in the wall of the housing 16, from a source of pressure fluid.

Each of the oil-distributor rings 40, 41 is formed with an annular distributing channel, 40ª or 41ª, which is in sealed communication with the outer face of a porous-bronze bushing 40ᵇ or 41ᵇ, adapted to transmit the oil by capillary attraction to the surface of the shaft and also to the leather or similar sealing rings 39, 39 in sufficient quantity only to keep them soft and pliable and lubricate them without causing substantial flow of oil into the annular space between them. For filling the distributing channels 40ª, 41ª with oil the rings 40, 41 are provided with oiler cups 40ᶜ, 41ᶜ.

For holding the distributor-ring assembly snugly against a bronze washer 45 mounted between it and the hub of the wheel a compression spring 46 is mounted between the distributor ring assembly and the inner face of the small end of the housing 16, the distributor ring 41 being formed with a marginal flange 41ᵈ to hold the spring in concentric relation.

The construction and arrangement are such that distention of the bag 23 by internal pressure, through the hose 44 and intermediate passages, forces the male clutch member 14 with its facing 15 in an axial direction into engagement with the female clutch member 13 and venting of the bag permits the springs 31 to disengage the clutch.

While in this embodiment only one pair of clutch members is shown, the invention is not limited to the use of a bag adapted to move only a single clutch member nor, in fact, to the use of a single bag.

In the modification shown in Fig. 3 the construction is in general like that of Fig. 1, except that the inner rigid member, 67, and the outer rigid member, 68, of the male clutch structure, are formed with sets of intermeshing teeth, 67ª, 68ª, for relieving the bag of the driving torque, the teeth being relatively slidable in an axial direction for engagement and disengagement of the clutch as the bag is inflated and deflated.

The mode of operation has been fully brought out in conjunction with the foregoing description of the structure, and it will be seen that the invention provides the advantages that are set out in the above statement of objects.

I claim:

1. An assembly of the character described comprising two mating structures having respective conical faces adapted to be frictionally engaged with each other, one of said structures comprising a fluid-distensible, flexible member for effecting such engagement and rigid members connected in series by, and wholly insulated from each other by, the said flexible member, so that it sustains the entire torque.

2. An assembly of the character described comprising two mating structures having respective conical faces adapted to be frictionally engaged with each other by relative axial movement, one of said structures comprising a fluid-distensible, flexible member for effecting such engagement and rigid members connected in series by, and wholly insulated from each other by, the said flexible member, so that it sustains the entire torque.

3. An assembly of the character described comprising two mating structures having respective conical faces adapted to be frictionally engaged with each other, one of said structures comprising a fluid-distensible, flexible member for effecting such engagement, the flexible member being substantially of torus shape and composed at least chiefly of a substance having substantially the resilient deformability of vulcanized soft rubber and comprising oppositely bulged approximately semi-circular walls which are unconfined and freely-flexing in service.

4. An assembly of the character described comprising rigid annular male and female structures having conical faces adapted to be frictionally engaged with each other by relative axial movement, one of said structures comprising a fluid-distensible, flexible member for effecting such engagement, the said flexible member being substantially of torus shape and composed at least chiefly of a substance having substantially the resilient deformability of vulcanized soft rubber and having oppositely bulged and approximately semi-circular walls which are unconfined and freely-flexing in service.

5. An assembly of the character described comprising two mating structures having respective conical faces adapted to be frictionally engaged with each other, one of said structures comprising a fluid-distensible, flexible member for effecting such engagement, and positive interlocking means for so sustaining torque in the last mentioned structure as to prevent its being sustained wholly by said flexible member, the said flexible member being substantially of torus shape and composed at least chiefly of a substance having substantially the resilient deformability of vulcanized soft rubber and having oppositely bulged and approximately semi-circular walls which are unconfined and freely-flexing in service.

6. An assembly of the character described comprising two mating structures having respective conical surfaces adapted to be frictionally engaged with each other by relative axial movement, one of said structures comprising a rigid force-receiving part and a rigid force-delivering part and, interposed between the two said parts, a fluid-distensible, flexible member composed at least chiefly of a substance having substantially the resilient deformability of vulcanized soft rubber and having oppositely bulged walls which are approximately semi-circular and are unconfined and freely-flexing in service.

THOMAS L. FAWICK.